(No Model.)  6 Sheets—Sheet 1.

J. BARKER.
GEAR CUTTING MACHINE.

No. 577,707.   Patented Feb. 23, 1897.

Witnesses:
R. Schleicher
Charles Le Coq

Inventor:
James Barker
by his Attorneys
Hinson & Hinson (No Model.)  6 Sheets—Sheet 2.

J. BARKER.
GEAR CUTTING MACHINE.

No. 577,707.  Patented Feb. 23, 1897.

Witnesses:
R. Schleicher.
Charles Le Cow

Inventor:
James Barker
by his Attorneys (No Model.) 6 Sheets—Sheet 3.

J. BARKER.
GEAR CUTTING MACHINE.

No. 577,707. Patented Feb. 23, 1897.

Witnesses:
R. Schleicher.
Charles LeBow

Inventor:
James Barker
by his Attorneys (No Model.) 6 Sheets—Sheet 4.

J. BARKER.
GEAR CUTTING MACHINE.

No. 577,707. Patented Feb. 23, 1897.

Witnesses:
R. Schleicher.
Charles A. Cow

Inventor:
James Barker
by his Attorneys (No Model.)  6 Sheets—Sheet 6.

J. BARKER.
GEAR CUTTING MACHINE.

No. 577,707.  Patented Feb. 23, 1897.

Witnesses:
R Schleicher
Charles He Cou

Inventor:
James Barker
by his Attorneys

UNITED STATES PATENT OFFICE.

JAMES BARKER, OF PHILADELPHIA, PENNSYLVANIA.

GEAR-CUTTING MACHINE.

SPECIFICATION forming part of Letters Patent No. 577,707, dated February 23, 1897.

Application filed October 17, 1895. Serial No. 565,995. (No model.)

*To all whom it may concern:*

Be it known that I, JAMES BARKER, a citizen of the United States, residing in Philadelphia, Pennsylvania, have invented certain Improvements in Gear-Cutting Machines, of which the following is a specification.

One object of my invention is to so construct a gear-cutting machine that the spindle upon which the blanks are mounted will be prevented from shaking, the firm retention of the spindle insuring accuracy of cut and rendering the machine substantially noiseless in its operation.

A further object is to provide means for readily reversing the machine when the cut is completed and quickly restoring the tool to position for commencing a fresh cut.

A still further object is to effect the quick shifting of the blanks from one position to the next after the cutting of each tooth.

These objects I attain in the manner hereinafter set forth, reference being had to the accompanying drawings, in which—

Figure 1:
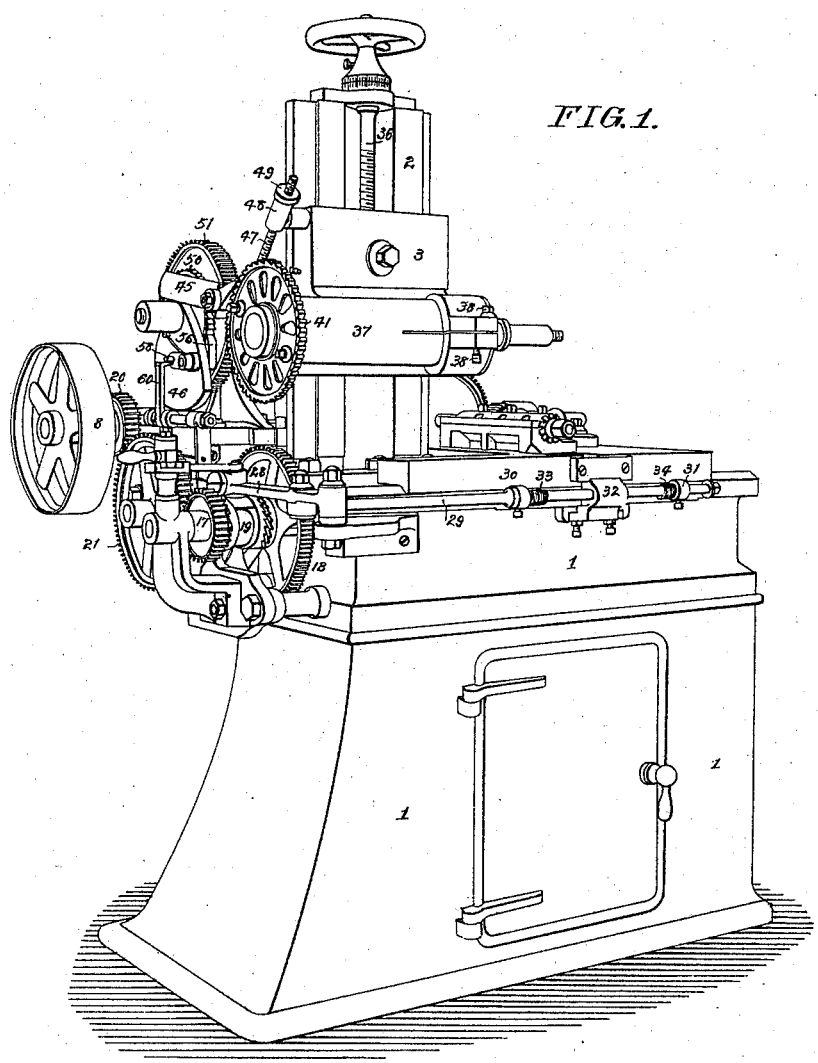
Figure 2:
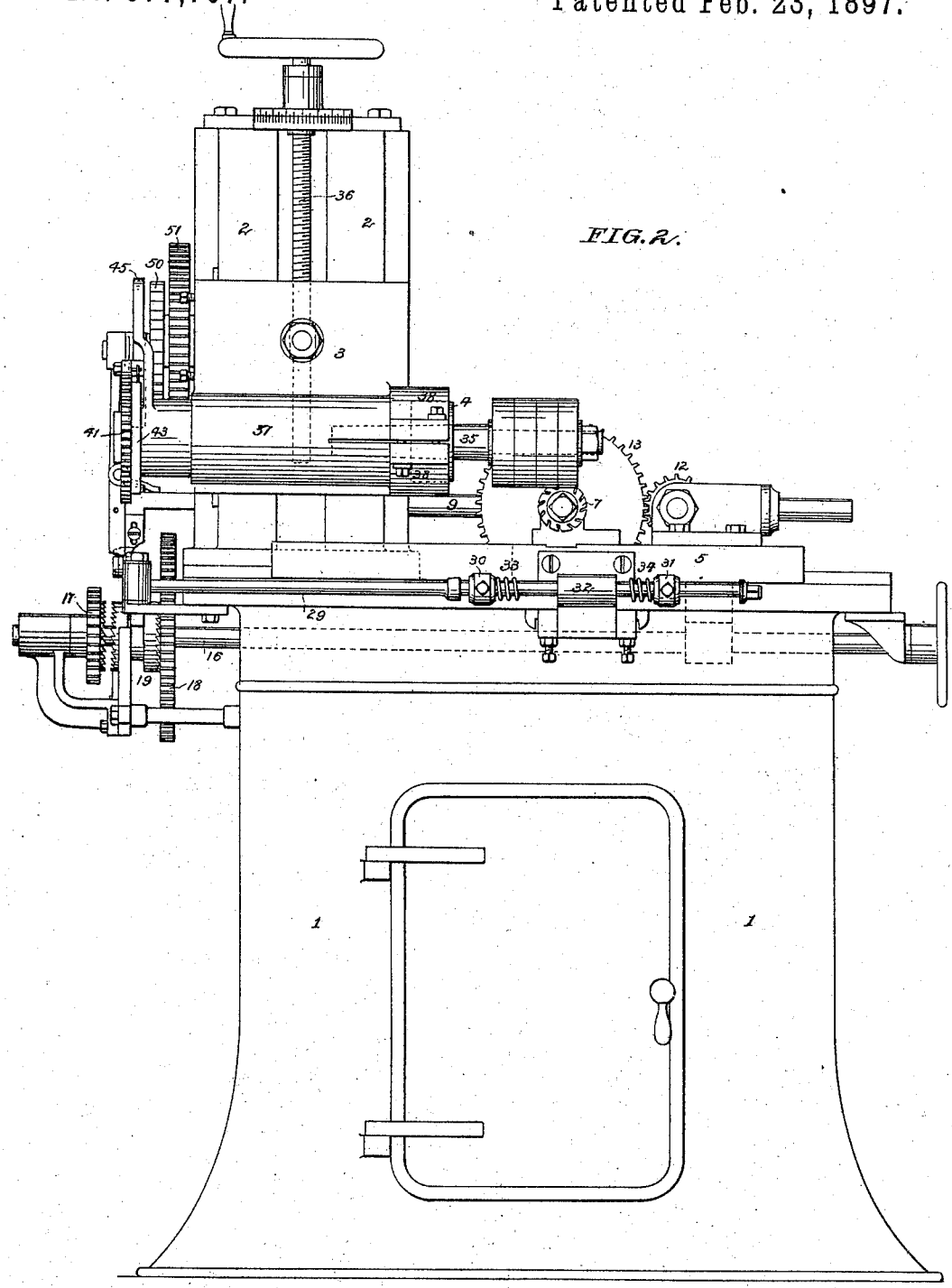
Figure 3:
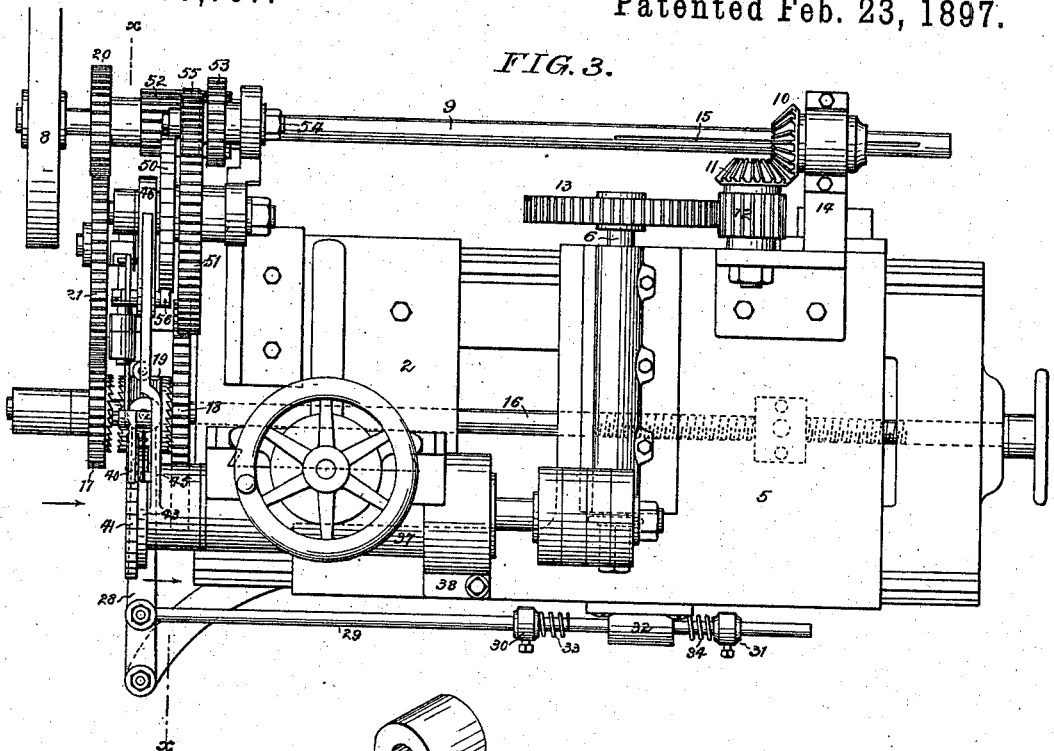
Figure 4:
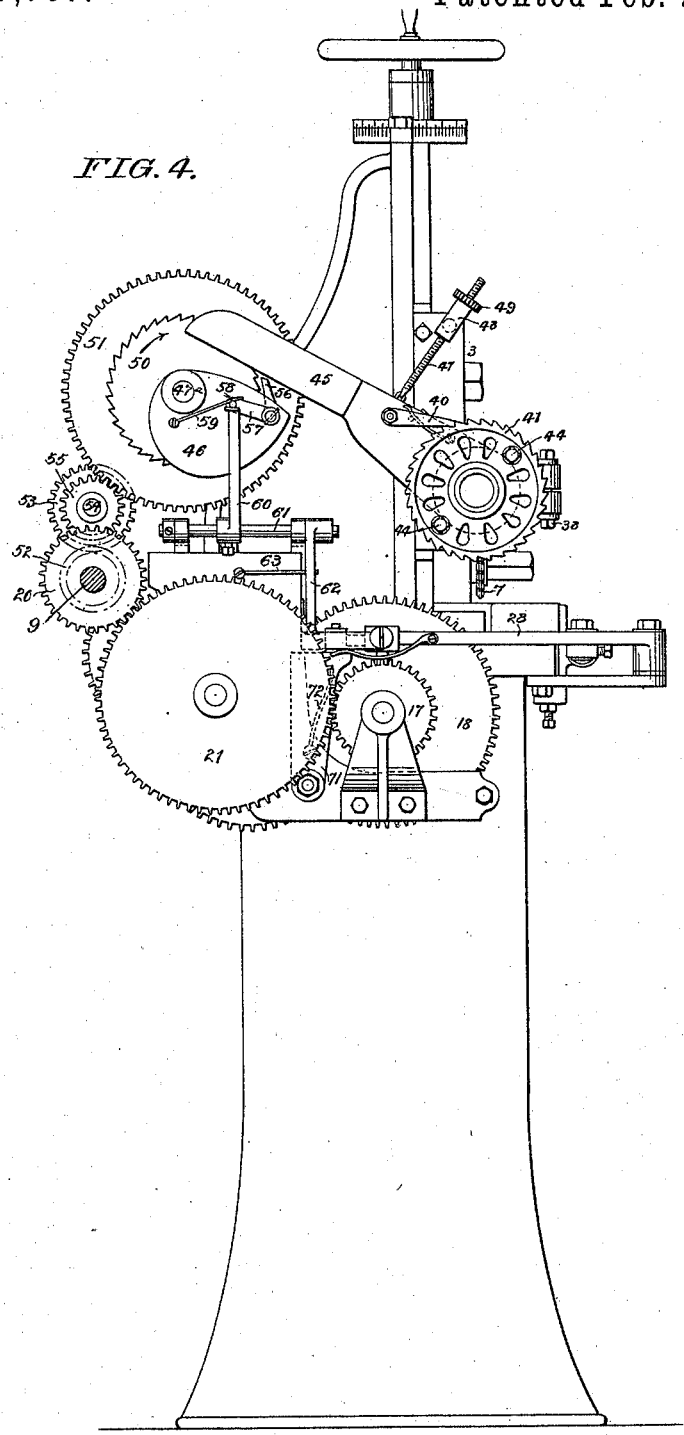
Figure 5:
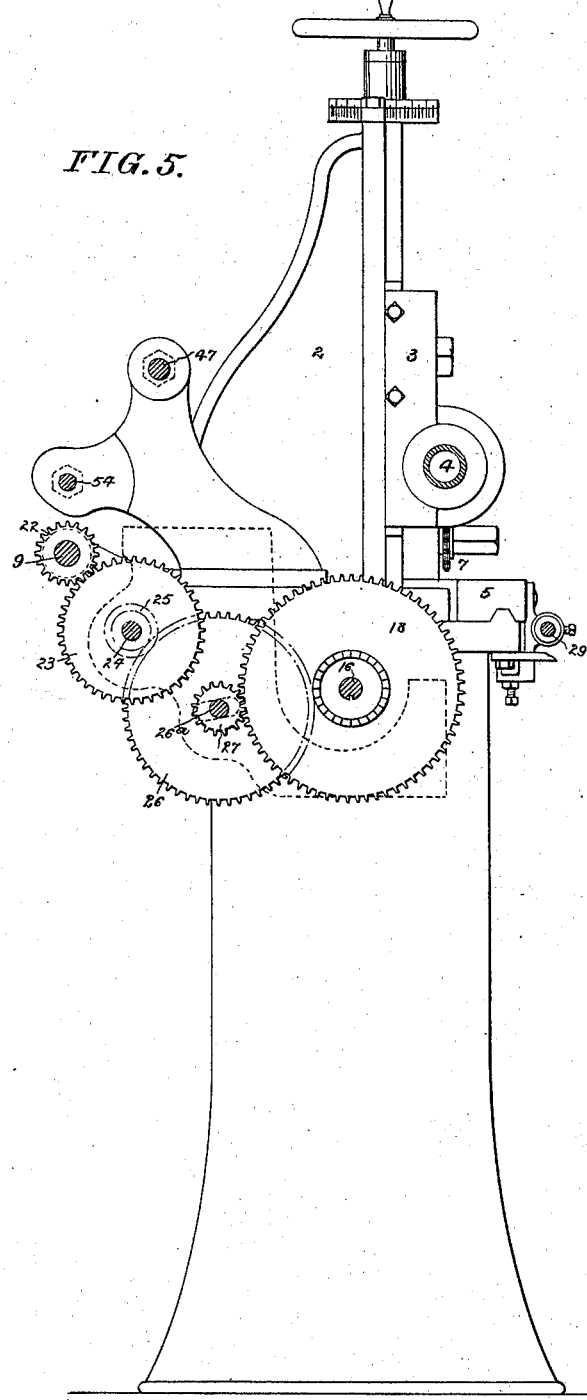
Figure 6:
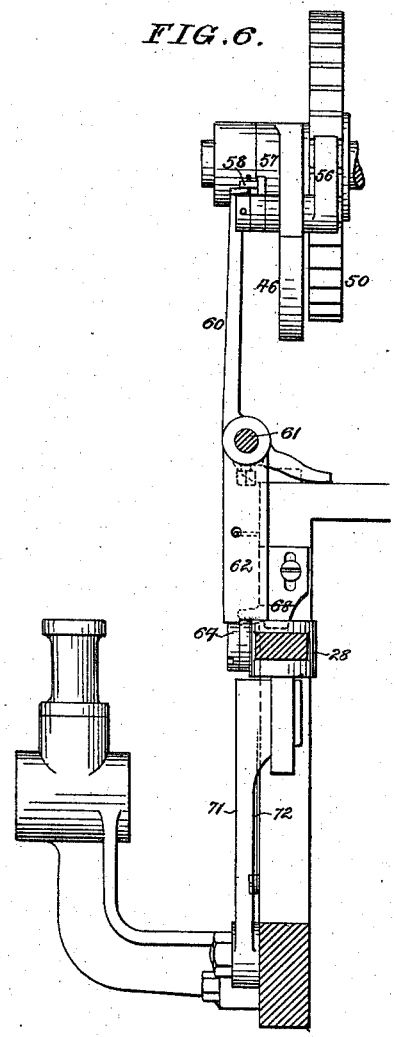
Figure 7:
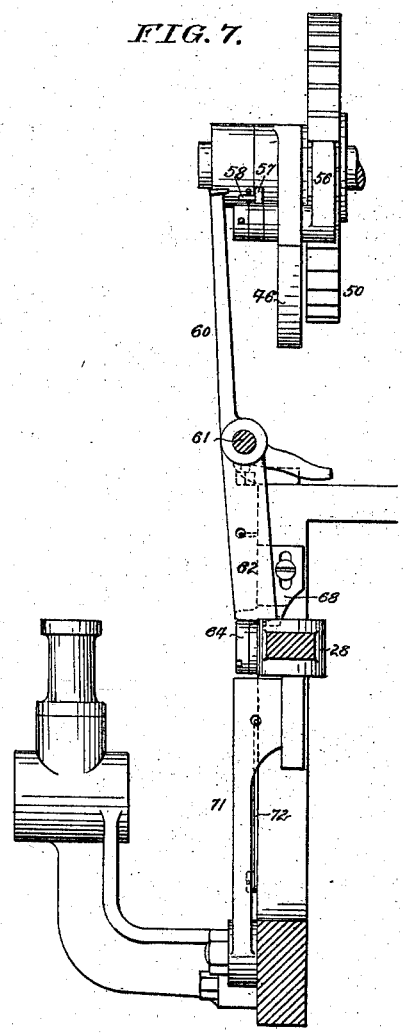
Figure 12:
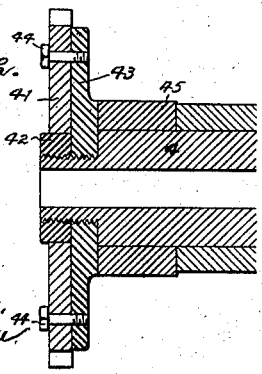
Figure 13:
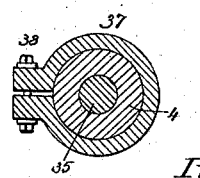

Figure 1 is a perspective view of a gear-cutting machine constructed in accordance with my invention. Fig. 2 is a front view of the same. Fig. 3 is a plan view. Fig. 4 is an end view looking in the direction of the arrow, Fig. 3. Fig. 5 is a transverse section on the line $x\,x$, Fig. 3; and Figs. 6 to 13, inclusive, are detached views illustrating special features of construction of parts of the machine.

The machine has a substantial stand or foundation 1, from the top of which projects upwardly a standard 2, having ways for the guidance of the vertically-adjustable carriage 3, in which is mounted the spindle 4 for carrying the blank or blanks to be cut, the top of the bed 1 also having ways for the longitudinal guidance of a carriage 5, which is provided with suitable bearings for the spindle 6 of the rotary milling-tool 7, whereby the cutting operation is effected.

Power is applied continuously to a belt-pulley 8, carried by a shaft 9 at the back of the machine, and from this shaft 9 rotary motion is imparted to the cutter-spindle 6 through the medium of a pair of bevel-wheels 10 and 11, a spur-pinion 12, and a spur-wheel 13, the bevel-wheel 10 being mounted so as to be free to turn in a bearing in a projecting bracket 14 on the carriage 5, but being longitudinally confined thereto, and having a feather adapted to a groove 15 in the shaft 9, so that while it is continually in driving connection with said shaft it can traverse longitudinally on the same.

The bevel-wheel 11, which meshes with the bevel-wheel 10, is secured to or forms part of the spur-pinion 12, and both of these are free to turn on a stud projecting from a bracket on the slide 5. The said slide has on the under side a nut engaging with the usual feed-screw 16, which, at the rear end of the machine, is combined with gearing, whereby either a slow movement in one direction or a quick movement in the opposite direction can be imparted to it. This mechanism comprises two clutch halves facing in opposite directions, one of these clutch halves being carried by a spur-pinion 17 and the other by a spur-wheel 18, both wheel and pinion being loose on the shaft 16.

Splined on the shaft between the spur-wheel and pinion is a double-faced clutch-sleeve 19, having one face adapted to engage with the teeth of the clutch half on the pinion 17 and the other with the teeth of the clutch half on the spur-wheel 18.

The pinion 17 constitutes the quick-speed driver or reverse motion for the feed-screw 16, said pinion being driven from a pinion 20 on the shaft 9 through the medium of an interposed spur-wheel 21. The spur-wheel 18 is the slow-feed gear for imparting forward movement to the feed-screw 16, and this wheel is driven from a pinion 22 on the shaft 9, said pinion meshing with a spur-wheel 23, mounted on a stud 24 and secured to a pinion 25, which meshes with a spur-wheel 26, carried by a stud $26^a$, which is adjustable in the slotted portion of the frame, as shown in Fig. 5, said wheel 26 being secured to or forming part of a pinion 27, which meshes with the wheel 18, so that the latter is driven in a direction the reverse of the pinion 17 and at much slower speed.

By varying the relative diameters of the spur-wheel 26 and pinion 27 the speed of the wheel 18 can be readily governed, the adjustability of the stud $26^a$, which carries said wheel 26 and pinion 27, providing for such variation in the relative diameters of the same.

The shifting of the clutch-sleeve 19 is effected by means of a lever 28, hung to a bracket at the front of the machine and connected to a shipper-rod 29, which has adjustable collars 30 and 31 and is embraced by a bracket 32 on the cutter-slide 5, suitable springs 33 and 34 bearing against the inner face of each of the collars 30 and 31 and serving to transmit the movement of the bracket 32 to said collar and to the shipper-rod in order that there may be a quick movement of the clutch-sleeve 19 from one extreme position to the other, the spring being compressed between the bracket 32 and the collar which said bracket is approaching until the resistance of the clutch is overcome, whereupon there is a quick shifting of the same into engagement with the opposite clutch.

The blank or series of blanks to be cut in order to form the desired spur wheel or wheels should be suitably mounted upon a mandrel 35, which in turn is secured to the spindle 4, the latter being adapted to a bearing on the vertically-adjustable slide 3, the vertical position of which is controlled by the adjusting-screw 36, so that it can be raised and lowered to accord with the diameter of the blank to be cut and of the milling-tool which is being used.

The bearing 37 for the spindle 4 is split at its front end, as shown in Figs. 1, 2, and 14, and is provided with clamping-screws 38, so that any desired degree of frictional hold upon the spindle 4 may be maintained. While this hold is not sufficient to prevent the ready turning of the spindle in order to advance the blank from one position to the next after the cutting of a tooth, it effectually overcomes any inaccuracy of cut which might be due to slight looseness of fit of the spindle in its bearing, the spindle, in fact, during the cutting operation being rigidly and immovably held in the bearing, so that an accurate cut naturally follows, and the jarring or "chattering" of the spindle, which is often noticed in ordinary gear-cutting machines, is effectually prevented.

The intermittent movement of the spindle 4 is effected by the action of a pawl 40, acting upon a ratchet-wheel 41, secured to the end of the spindle, and in order to provide for the ready removal and replacing of this ratchet-wheel, so as to permit of the use of wheels having a varying number of teeth to accord with the size and pitch of the wheel which it is desired to cut, I secure to the end of the spindle 4, by means of a nut 42, a face-plate 43 and secure the ratchet-wheel 41 to this face-plate by means of bolts 44, so that one ratchet-wheel can be readily slipped off and another inserted in its place.

The pawl 40 is carried by an arm 45, loosely mounted on the projecting end of the spindle 4 and acted upon at appropriate intervals by means of a cam 46, loosely mounted on the end of a shaft or stud $47^a$.

Hung to the back of the arm 45 is a screw-rod 47, which passes freely through a swinging lug 48, hung to a bracket on the vertical slide 3, said screw-rod having a nut 49, which, by contact with the top of the tubular stud 48, serves to limit the descent of the arm 45. Hence by adjusting this nut on the rod 47 such descent can be limited and the movement of the arm under the action of the cam 46 thus restricted to any desired extent, the movement of the ratchet-wheel 41 to the extent of one or more teeth on each vibration of the arm 45 being thereby effected.

Mounted on the shaft or stud $47^a$ are a ratchet-wheel 50 and a spur-wheel 51, secured together so as to rotate in unison, said spur-wheel being driven from the shaft 9 through the medium of a spur-pinion 52, which meshes with a spur-wheel 53 on a stud 54, said spur-wheel 53 being connected to a pinion 55, which meshes with the spur-wheel 51, so that the ratchet-wheel 50 is driven continuously in the direction of the arrow, Fig. 4.

Mounted on the cam 46 is a pawl 56, which has an arm 57, with projecting pin 58, and this pin is acted on by a spring 59, which tends to move the pawl into engagement with the ratchet-wheel 50, but the pawl is normally held out of engagement with the ratchet-wheel by means of a trip-arm 60, which bears upon the pin 58 and is carried by a rock-shaft 61, having another arm 62, acted upon by a spring 63, tending to maintain the upper end of the trip-arm 60 in engagement with the pin 58.

The pawl 56 is held out of engagement with the ratchet-wheel 50 during the entire time that the cutter is acting upon the blank, during the shifting of the clutch from the slow to the fast speed gear, and during the retraction of the cutter, but as soon as the cutter has cleared the blank on the return stroke the trip-arm 60 is moved so as to release the pin 58 from its control, and the pawl 56 is thus permitted to engage with the ratchet-wheel 50 until one turn of the cam has been effected, by which time the trip-arm has been restored to its original position and the pawl 56 is again thrown out of engagement with the ratchet-wheel until the cutting of another tooth has been effected.

Figures 8, 9:
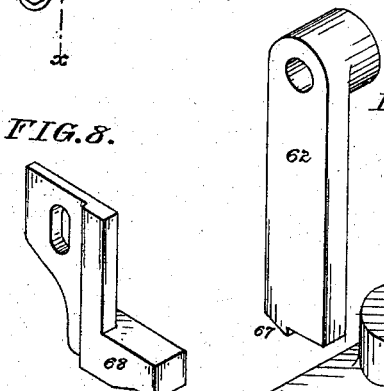
Figure 10:
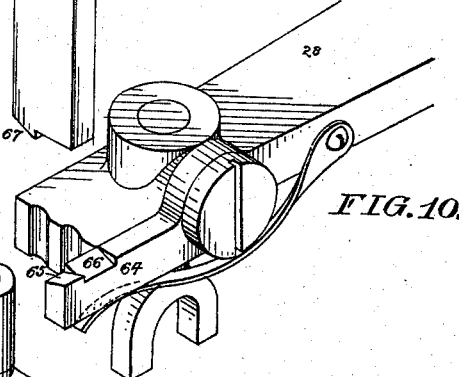

The throwing of the trip-arm 60 out of operation at the proper time is effected by a spring-trigger 64, Fig. 10, carried by the clutch-operating lever 28 and having beveled faces 65 and 66, the latter being adapted to engage with a toe 67 on the arm 62, Fig. 9, so as to trip said arm just before the lever 28 has completed its movement in the direction of the arrow, Fig. 3, the trigger being then depressed by contact of its face 65 with a fixed cam 68, Fig. 8, on the frame, so as to release the face 66 from engagement with the toe 67. On the movement of the clutch-lever in the opposite direction the trigger 64 is depressed by contact with the arm 62, so as to have no effect upon said arm during this movement. By this means the desired quick movement of the blank from one position to the next is effected in the limited time which elapses between the retraction of the cutting-tool and the beginning of its next forward movement.

Figure 11:
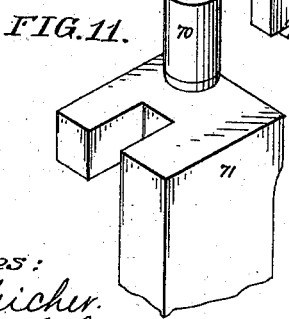

As shown in Fig. 11, an antifriction-roller 70 is carried by an arm 71, which is pivoted to the fixed frame and is acted upon by a spring 72, which tends to keep the roller in engagement with either of a pair of notches 73 in the clutch-lever 28 and thus retains the latter against accidental displacement when in either of its extreme positions.

Having thus described my invention, I claim and desire to secure by Letters Patent—

1. A gear-cutting machine in which the spindle carrying the blank is combined with mechanism for automatically imparting intermittent movements of partial rotation thereto, and with a split and compressible bearing constituting a friction-clutch for said spindle, substantially as specified.

2. The combination of the work-carrying spindle and its ratchet-wheel, an arm having a pawl for engaging said ratchet-wheel, a cam for acting on said arm, a continuously-rotating driving-gear for said cam, and means for intermittently clutching the cam to and releasing it from said gear.

3. The combination of the work-carrying spindle, and its ratchet-wheel, an arm having a pawl for engaging said ratchet-wheel, a cam for actuating said arm, a continuously-rotated ratchet-wheel, a pawl whereby the cam can be clutched to said ratchet-wheel, a tripper-arm whereby the pawl is normally held out of engagement with the ratchet-wheel, and means for moving said tripper-arm out of operative position at intervals.

4. The combination of the work-carrying spindle and its ratchet-wheel, an arm having a pawl for engaging said ratchet-wheel, a cam for actuating said arm, a continuously-operated ratchet-wheel, a pawl whereby the cam can be clutched to said ratchet-wheel, a trip-arm for normally holding said pawl out of engagement with the ratchet-wheel, a clutch-lever forming part of the reversing mechanism of the machine, and means whereby said lever is caused to move said trip-arm out of operative position in order to permit clutching of the cam to its ratchet-wheel.

5. The combination of the work-carrying spindle and its ratchet-wheel, an arm having a pawl for engaging said ratchet-wheel, a cam for actuating said arm, a continuously-operated ratchet-wheel, a pawl whereby the cam can be clutched to said ratchet-wheel, a trip-arm for normally holding said pawl out of engagement with the ratchet-wheel, a clutch-lever forming part of the reversing mechanism of the machine, a spring-trigger carried by said lever, and adapted to move the trip-arm, and a cam for throwing said trigger out of action when the trip-arm has been moved to a sufficient extent, substantially as specified.

6. The combination of the work-carrying spindle and its ratchet-wheel, the arm having a pawl for engaging with said ratchet-wheel, a cam for moving said arm in one direction and means for limiting the descent of the arm, said means comprising a threaded rod hung to the arm, a stud through which said rod passes, and a nut carried by the rod and serving by contact with said stud to limit the descent of the pawl-carrying arm, substantially as specified.

7. The combination of the work-carrying spindle shouldered and threaded at the rear end, with a face-plate confined against said shoulder by a nut adapted to the thread of the spindle, and bearing against the face-plate, and a feed-ratchet secured to said face-plate, said feed-ratchet having a central opening for the reception of the nut, substantially as specified.

In testimony whereof I have signed my name to this specification in the presence of two subscribing witnesses.

JAMES BARKER.

Witnesses:
FRANK E. BECHTOLD,
JOS. H. KLEIN.